US009652695B2

(12) United States Patent
Bengio et al.

(10) Patent No.: US 9,652,695 B2
(45) Date of Patent: May 16, 2017

(54) LABEL CONSISTENCY FOR IMAGE ANALYSIS

(71) Applicant: Google Inc., Mountain View, CA (US)

(72) Inventors: Samy Bengio, Los Altos, CA (US); Jeffrey Adgate Dean, Palo Alto, CA (US); Quoc Le, Mountain View, CA (US); Jonathon Shlens, San Francisco, CA (US); Yoram Singer, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 251 days.

(21) Appl. No.: 14/135,816

(22) Filed: Dec. 20, 2013

(65) Prior Publication Data

US 2015/0178596 A1 Jun. 25, 2015

(51) Int. Cl.
*G06K 9/62* (2006.01)
*G06K 9/72* (2006.01)
*G06N 7/00* (2006.01)
*G06N 99/00* (2010.01)
*G06K 9/00* (2006.01)

(52) U.S. Cl.
CPC ......... *G06K 9/723* (2013.01); *G06K 9/00677* (2013.01); *G06K 9/6212* (2013.01); *G06K 9/72* (2013.01); *G06N 7/005* (2013.01); *G06N 99/005* (2013.01); *G06K 2009/6213* (2013.01)

(58) Field of Classification Search
None
See application file for complete search history.

(56) References Cited

U.S. PATENT DOCUMENTS

| 7,853,071 | B2 | 12/2010 | Friedhoff et al. |
| 8,059,898 | B2 | 11/2011 | Friedhoff et al. |
| 8,254,643 | B2 | 8/2012 | Shi et al. |
| 8,819,024 | B1* | 8/2014 | Toderici et al. ............. 707/740 |
| 2006/0242147 | A1* | 10/2006 | Gehrking .......... G06F 17/30707 |
| 2009/0304272 | A1* | 12/2009 | Makadia et al. ............. 382/165 |
| 2009/0310854 | A1* | 12/2009 | Mei ........................ G06K 9/342 382/159 |

(Continued)

OTHER PUBLICATIONS

Galleguillos, Carolina, Andrew Rabinovich, and Serge Belongie. "Object categorization using co-occurrence, location and appearance." Computer Vision and Pattern Recognition, 2008. CVPR 2008. IEEE Conference on. IEEE, 2008. 9 pages.*

(Continued)

*Primary Examiner* — Sumati Lefkowitz
*Assistant Examiner* — Ryan P Potts
(74) *Attorney, Agent, or Firm* — Fish & Richardson P.C.

(57) ABSTRACT

Systems and techniques for labeling objects within an image. The objects may be labeled by selecting an option from a plurality of options such that each option is a potential label for the object. An option may have an option score associated with. Additionally, a relation score may be calculated for a first option and a second option corresponding to a second object in an image. The relation score may be based on a frequency, probability, or observance corresponding to the co-occurrence of text associated with the first option and the second option in a text corpus such as the World Wide Web. An option may be selected as a label for an object based on a global score calculated based at least on an option score and relation score associated with the option.

23 Claims, 5 Drawing Sheets

(56) References Cited

U.S. PATENT DOCUMENTS

2010/0106486 A1* 4/2010 Hua .................. G06K 9/723
704/9

OTHER PUBLICATIONS

Socher, Richard, and Li Fei-Fei. "Connecting modalities: Semi-supervised segmentation and annotation of images using unaligned text corpora." Computer Vision and Pattern Recognition (CVPR), 2010 IEEE Conference on. IEEE, 2010. 10 pages.*

Bengio, Samy, et al. "Using web co-occurrence statistics for improving image categorization." arXiv preprint arXiv:1312.5697 (2013). 11 pages.*

Peng, Fuchun, and Andrew McCallum. "Information extraction from research papers using conditional random fields." Information processing & management 42.4 (2006): 963-979. 9 pages.*

Bengio et al.,"Label Embedding Trees for Large Multi-Class Tasks", In Advances in Neural Information Processing Systems, 2010.

Chen et al.,"Understanding Web Images by Object Relation Network", In Proceedings of the 21st World Wide Web Conference, pp. 291-300, 2012.

Deng et al.,"Fast and Balanced: Efficient Label Tree Learning for Large Scale Object Recognition", Neural Information Processing Systems, pp. 567-575, 2011.

Deng et al.,"ImageNet: A Large-Scale Hierarchical Image Database", In IEEE Computer Vision and Pattern Recognition (CVPR),, 2009.

Duchi,"Adaptive Subgradient Methods for Online Learning and Stochastic Optimization", Journal of Machine Learning Research, 12, pp. 2121-2159, 2011.

Galleguillos et al.,"Object Categorization using Co-Occurrence, Location and Appearance", In IEEE Conference on Computer Vision and Pattern Recognition, 2008.

Heitz et al.,"Learning Spatial Context: Using Stuff to Find Things", Proceedings of the 10th European Conference on Computer Vision: Part I, pp. 30-43, 2008.

Hinton et al.,"Improving neural networks by preventing co-adaptation of feature detectors", arXiv: 1207.0580, 2012.

Ising,"Beitrag zur Theorie des Ferromagnetismus", Zeitschrift fur Physik, vol. 31, issue 1, pp. 253-258, Feb. 1925.

Krizhevsky et al.,"ImageNet Classification with Deep Convolutional Neural Networks", Advances in Neural Information Processing Systems, pp. 1106-1114, 2012.

Le et al.,"Building High-level Features Using Large Scale Unsupervised Learning", In International Conference on Machine Learning, 2012.

Marszalek et al.,"Semantic Hierarchies for Visual Object Recognition", IEEE Conference on Computer Vision and Pattern Recognition, Jun. 2007.

Rabinovich et al.,"Objects in Context", IEEE 11th International Conference on Computer Vision, 2007.

Torralba et al.,"Contextual Priming for Object Detection", International Journal of Computer Vision, 53(2), pp. 169-191, 2003.

Xiao et al.,"SUN Database: Large-scale Scene Recognition from Abbey to Zoo", In IEEE Conference on Computer Vision and Pattern Recognition, pp. 3485-3492, 2010.

* cited by examiner

LABEL CONSISTENCY FOR IMAGE ANALYSIS

BACKGROUND

Some techniques for performing computer vision tasks such as image object recognition use a trained machine learning model. The model typically is trained based upon the attributes that belong to each object in an image, such as color, curves, and the like, by providing the model with labeled training data. Based on the labeled training data, the model may learn that, for example, a grey object that is curved on one end and contains a trunk-like shape on the other end is most likely an elephant. The trained model is then provided with non-labeled images, in which the model attempts to identify and label objects based on the prior training.

BRIEF SUMMARY

According to implementations of the disclosed subject matter, an option (e.g., a potential label for an object) for a first object in an image may be received and may be an option from multiple options corresponding to the first object. An option for a second object in the image may also be received and may be an option from multiple options corresponding to the second object. A relation score between the first option and the second option may be generated based on a co-occurrence model The option for the first object may be designated as a label for the first object based on solving a global optimization problem utilizing at least the relation score. The co-occurrence model may be trained using a text corpus such as the World Wide Web. The relation score may be determined based on the frequency at which text associated with the first option and the second option co-occur.

According to implementations of the disclosed subject matter, a first option for a first object in an image may be received and may be an option from multiple options corresponding to the first object. A second option for the first object may also be received and may also be an option from multiple options corresponding to the first object. A control label may also be received and may correspond to a second object in the image. A first relation score between the first option and the control label may be generated based on a co-occurrence model. Similarly, a second relation score between the second option and the control label may be generated based on the co-occurrence model. It may be determined that the first relation score exceeds the second relation score and, based on the determination, the first option may be selected as a label for the first object in the image.

According to implementations of the disclosed subject matter, a first option may be received for a first a first patch within an image. A second option for a second patch within the image may also be received. A first option score for the first patch may be generated and a first relation score may be generated based on the consistency between the first option and the second option. A first global score may be generated for the first patch based on the first option score and the first relation score. Further, a third option for the first patch within the image may be received and a second option sore may be generated for the first patch. A second relation score may be generated based on the consistency between the third option and the second option and a second global score for the first patch may be generated based on the third option score and the second relation score. The first global score and second global score may be compared and an option may be designated as a label for the first object in the image based on the comparison.

Systems and/or computer readable medium, as disclosed herein, may be configured to receive an option for a first object in an image and may be an option from multiple options corresponding to the first object. An option for a second object in the image may also be received and may be an option from multiple options corresponding to the second object. A relation score between the first option and the second option may be generated based on a co-occurrence model. The option for the first object may be designated as a label for the first object based on solving a global optimization problem utilizing at least the relation score. The co-occurrence model may be trained using a text corpus such as the World Wide Web. The relation score may be determined based on the frequency at which text associated with the first option and the second option co-occur.

Systems and/or computer readable medium, as disclosed herein, may be configured to receive a first option for a first object in an image, the option may be an option from multiple options corresponding to the first object. A second option for the first object may also be received and may also be an option from multiple options corresponding to the first object. A control label may also be received and may correspond to a second object in the image. A first relation score between the first option and the control label may be generated based on a co-occurrence model. Similarly, a second relation score between the second option and the control label may be generated based on the co-occurrence model. It may be determined that the first relation score exceeds the second relation score and, based on the determination, the first option may be selected as a label for the first object in the image.

Systems and/or computer readable medium, as disclosed herein, may be configured to receive a first option for a first a first patch within an image. A second option for a second patch within the image may also be received. A first option score for the first patch may be generated and a first relation score may be generated based on the consistency between the first option and the second option. A first global score may be generated for the first patch based on the first option score and the first relation score. Further, a third option for the first patch within the image may be received and a second option sore may be generated for the first patch. A second relation score may be generated based on the consistency between the third option and the second option and a second global score for the first patch may be generated based on the third option score and the second relation score. The first global score and second global score may be compared and an option may be designated as a label for the first object in the image based on the comparison.

Systems and techniques according to the present disclosure enable labeling objects within an image based on context relevant relations between objects that are established using a text corpus. Additional characteristics, advantages, and implementations of the disclosed subject matter may be set forth or apparent from consideration of the following detailed description, drawings, and claims. Moreover, it is to be understood that both the foregoing summary and the following detailed description include examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Techniques and systems described herein can be applied to generate labels that identify objects within an image. Typical object recognition and labeling systems may experience problems identifying objects within an image due to various factors such as a limited training set, an imprecise recognition model, limited availability of resources for use by the model, or the like. As described herein, objects recognition and/or localization may be improved by utilizing contextual information during training and/or operation of a learned object identification model. Contextual information may be utilized by validating that two or more identified objects within an image are in fact likely to be present in the same image. The validation may be conducted based on whether text corresponding to the two or more objects co-occurs in a text corpus such as documents on the World Wide Web. As a specific example, it may be contextually invalid to expect that an image will contain an elephant in the middle of an ocean. Techniques described herein may label objects in images based both on the object recognition as well as contextual validation via text co-occurrence detection, and may provide techniques for producing trained machine learning systems that identify and/or generate such labels. A label that identifies an object in an image may be used for one or more applications such as to identify all or part of the image, to tag the image, to retrieve the image, or the like. As a specific example, a user may input a search query into a search engine. The search engine may provide one or more images as a result of the search query. The one or more images may be selected based on a match between the search query and object labels corresponding to objects contained in the images.

According to implementations of the disclosed subject matter, multiple potential or proposed labels, referred to herein as options, may be generated and/or received for one or more objects in an image. For example, an image patch labeler as disclosed herein may receive an arbitrary patch of an image and provide options scores for options that describe the image patch. Generally, an image patch may encompass one or more objects within the image, and a patch may overlap one or more other patches from the same image.

Figure 5:
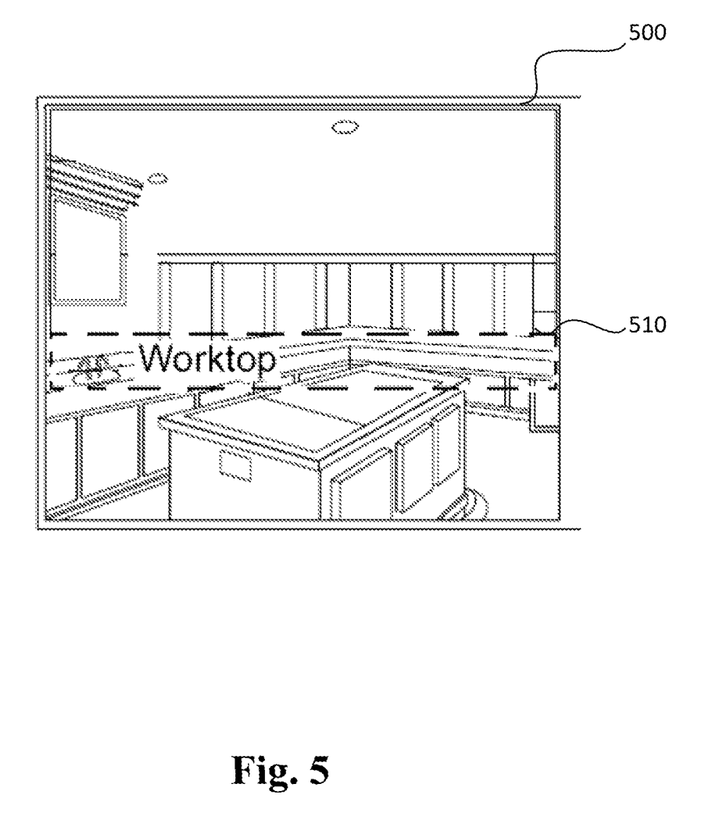
FIG. 5 shows an example illustration of a labeled object, according to an implementation of the disclosed subject matter.

According to an implementation, a machine patch labeler may use a trained machine learning model that can be applied to data extracted from an image, such as an object within the image and one or more options may be generated based on applying the machine learned model to the data extracted from the image. As an illustrative example, as shown in FIG. 5, an image may contain multiple objects (e.g., the worktop, sink, etc.). For a single object, multiple options may be generated and/or scored by any applicable technique such as edge detection, primal sketch, recognition by parts (e.g., generalized cylinders, geons, etc.), edge matching, divide-and-conquer search, greyscale matching, gradient matching, histograms of receptive field responses, applying a modelbase, or the like. Continuing the example, a plurality of options may be generated for object 510 within the image 500. The options may include 'worktop', 'countertop', 'granite', and 'ice slab'. The options may be ranked by a likelihood that the option corresponds to the object in the image. Alternatively or in addition, an option score threshold may be generated for a group of options, and options that receive an option score below the threshold may be eliminated as potential options corresponding to the object.

According to implementations of the disclosed subject matter, a corpus, such as text found on the World Wide Web may be analyzed and data may be gathered regarding co-occurring text as described in further detail herein. A co-occurrence may be any applicable co-occurrence such as adjacent words or terms, two or more words or terms appearing within a given number of words or area, two or more words or terms appearing in the same sentence, two or more words or terms appearing in the same paragraph, two or more words or terms appearing in the same page, two or more words or terms appearing in the same document, or the like. As an example, the sentence "President Obama may feed the national dolphin on Saturday" contains a co-occurrence of 'dolphin' and 'Obama' in the same sentence, paragraph, and document and does not contain a co-occurrence of the two adjacent to each other. A co-occurrence may be predefined as adjacent words or terms, two or more words or terms appearing within a given number of words or area, two or more words or terms appearing in the same sentence, two or more words or terms appearing in the same paragraph, two or more words or terms appearing in the same page, two or more words or terms appearing in the same document, or the like. Whether or not a particular arrangement of terms is considered a co-occurrence, or the importance given to a co-occurrence, may be based on weights assigned to different types of co-occurrence. As an example of a weight based co-occurrence, a co-occurrence of adjacent words may receive a higher weight than a co-occurrence of two words that are within the same paragraph as each other but are not immediately adjacent within a sentence.

A co-occurrence model may be generated based on the co-occurrence data and/or additional analysis of that data. The data may be any applicable data related to text and co-occurring text, such as the number of times two or more words occur next to or near each other, the proximity of co-occurring words, the frequency of co-occurrence, or the like. As an example, data may be gathered for the number of times the nouns 'dolphin' and 'ocean' co-occur as well as the number of times the nouns 'dolphin' and 'Obama' co-occur.

Based on typical use of these terms, it may be expected that the number of times 'dolphin' and 'ocean' co-occur is likely to be higher than the number of times 'dolphin' and 'Obama' co-occur.

According to implementations of the disclosed subject matter, a relation score may be generated for two or more words or terms. The relation score can be based on the detected co-occurrence within a text corpus, the co-occurrence corresponding to text associated with objects in an image. A relation score may be simply a count of the number of times or frequency of how often two or more words or terms co-occur. Alternatively or in addition, the relation score may be based on weighted co-occurrence such that a first type of co-occurrence may result in a higher score than a second type of co-occurrence as previously described. As a specific example, a same sentence co-occurrence may correspond to a 2× weight such that if two words J and K are within a common sentence 5000 different times, then the relation score may be calculated by multiplying 5000 by 2 to generate 10,000. An adjacent co-occurrence may correspond to a 3× weight such that if two different words M and N are next to each other 4000 different times, then the relation score may be calculated by multiplying 4000 by 3 to generate 12,000. Accordingly, although the number of times that M and N are adjacent to each other is lower than the number of times J and K appear in the same sentence, the adjacent co-occurrences are given a higher weight and results in a higher value to base the relation score on. The relation score may be the weighted value of co-occurrences themselves or may be generated based on the weighted values. As an example, the relation score for a pair of words may be generated based on the weighted co-occurrence score for the words divided by the highest weighted co-occurrence score for any pair of words. It will be understood that the weights for each co-occurrence score may be dependent on a given image and may be a result of the optimization problem for each image.

As an example of generating a relation score, a probability of observing two options, i and j in the same image may be determined by analyzing a sample of documents, such as documents harvested from the World Wide Web, a standardized text corpus, or other source. The specific number of documents used may vary depending upon the availability of documents and/or processing resources, the extent and/or accuracy desired in a particular context or for a particular word or type of word, or any other metric. In some cases, millions, billions, tens of billions, or more documents may be used, and in general it may be preferable to analyze a higher number of documents. For each document, every possible sub-sequence of consecutive words of a given length may be examined. The number of times each option was observed along with the number of co-occurrences of label-pairs within each consecutive window may be counted. Estimates for the point-wise mutual information (i.e., a measure of the association between the options) $s_{i,j}$ may be calculated using:

$$s_{i,j} = \log\left(\frac{p(i, j)}{p(i)p(j)}\right)$$

where p(i, j) and p(i) are the normalized counts for the number of times each option was observed along with the number of co-occurrences of option-pairs within each consecutive fixed-length window. All pairs whose co-occurrence count is below a co-occurrence threshold may be discarded and, thus, relation scores $S_{i,j}$ may be generated based on:

$$S_{i,j} = \begin{cases} \frac{1}{1 + \exp(-s_{i,j})}, & \text{if } s_{i,j} > 0 \\ 0 & \text{otherwise} \end{cases}.$$

Only the pairs whose point-wise mutual information is positive, which corresponds to option-pairs which tend to appear together, may be applied to generate a relation score.

Figure 3:
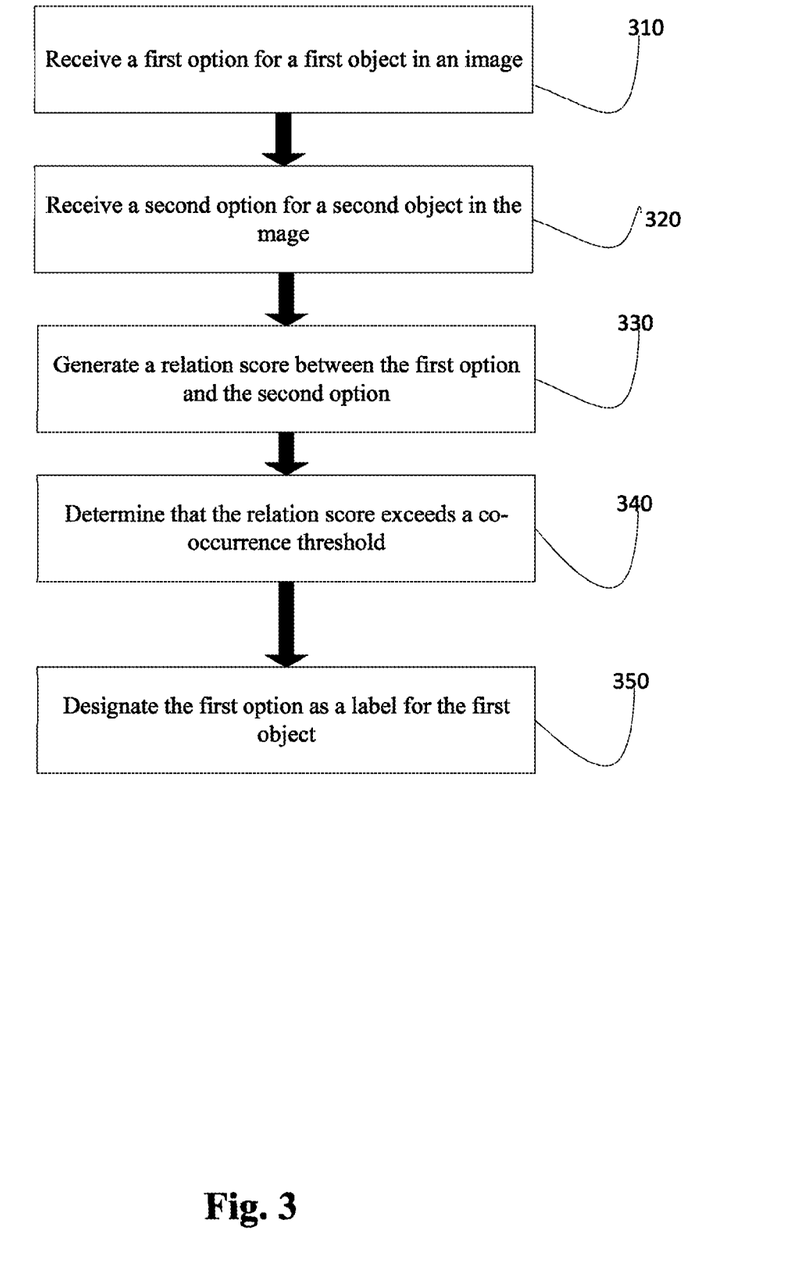
FIG. 3 shows an example process of labeling an object, according to an implementation of the disclosed subject matter.

According to an implementation of the disclosed subject matter, as shown in FIG. 3, an object in an image may be recognized and a first option corresponding to the object in the image may be received, at 310. A second object may be recognized and a second option corresponding to the second object in the image may be received, at 320. The first option and the second option may be paired and, as disclosed herein, a relation score may be generated for the first and second option, at 330. The relation score may be based on weighted co-occurrences of the first and second option, as disclosed herein. A co-occurrence threshold may be predetermined such that a relation score below the co-occurrence threshold indicates a low likelihood that two options co-occur within an image. As a specific example, if a co-occurrence threshold is 0.7 and the relation score for a pair of words, 'dolphin' and 'Obama' is 0.6 then it may be determined that an object corresponding to 'dolphin' and one corresponding to 'Obama' are not likely to occur in the same image. Alternatively, a relation score that meets or exceeds a co-occurrence threshold may correspond to a high likelihood that the two options co-occur within an image. As a specific example, if a co-occurrence threshold is 0.7 and the relation score for a pair of words, 'dolphin' and 'ocean' is 0.94, then it may be determined that an object corresponding to 'dolphin' and one corresponding to 'ocean' are likely to be in the same image. Accordingly, a determination may be made, at 340, of whether a relation score exceeds a co-occurrence threshold and, if the relation score exceeds the co-occurrence threshold then an option may be applied as a label for a corresponding object, at 350. Alternatively, the calculated relation score may be utilized when solving global optimization problem, as disclosed herein. The relation score may be one of multiple components associated with solving the global optimization problem.

The contextual relation between multiple options corresponding to multiple objects in an image may be analyzed to determine the likelihood that the multiple objects are present in the image. Essentially, the multiple options corresponding to multiple objects may be identified by an image patch labeler and an option score may be calculated for each of the multiple options. The multiple options may be contextually validated (or invalidated) by a relation score that corresponds to a probability or observance of two or more of the options occurring together within a text corpus. As disclosed herein, a global score may be calculated and may be based at least on an option score as well as a relation score. The global score may be directly correlated to both the option score and the relation score such that a higher options score and/or a higher relation score may result in a higher global score. Accordingly, even if an option does not receive a high relation score, the corresponding object may be labeled as the option if a high option score results in a global score above an applicable threshold. As an example, a global threshold may be 95 such that the global score is a simple addition of an option score and a relation score corresponding to an option. Accordingly, if an option, elephant, is generated for an object within an image and the option score for the option, elephant, is 96, then the option may be applied as a label for the corresponding object regardless of what the relation score is.

Figure 4:
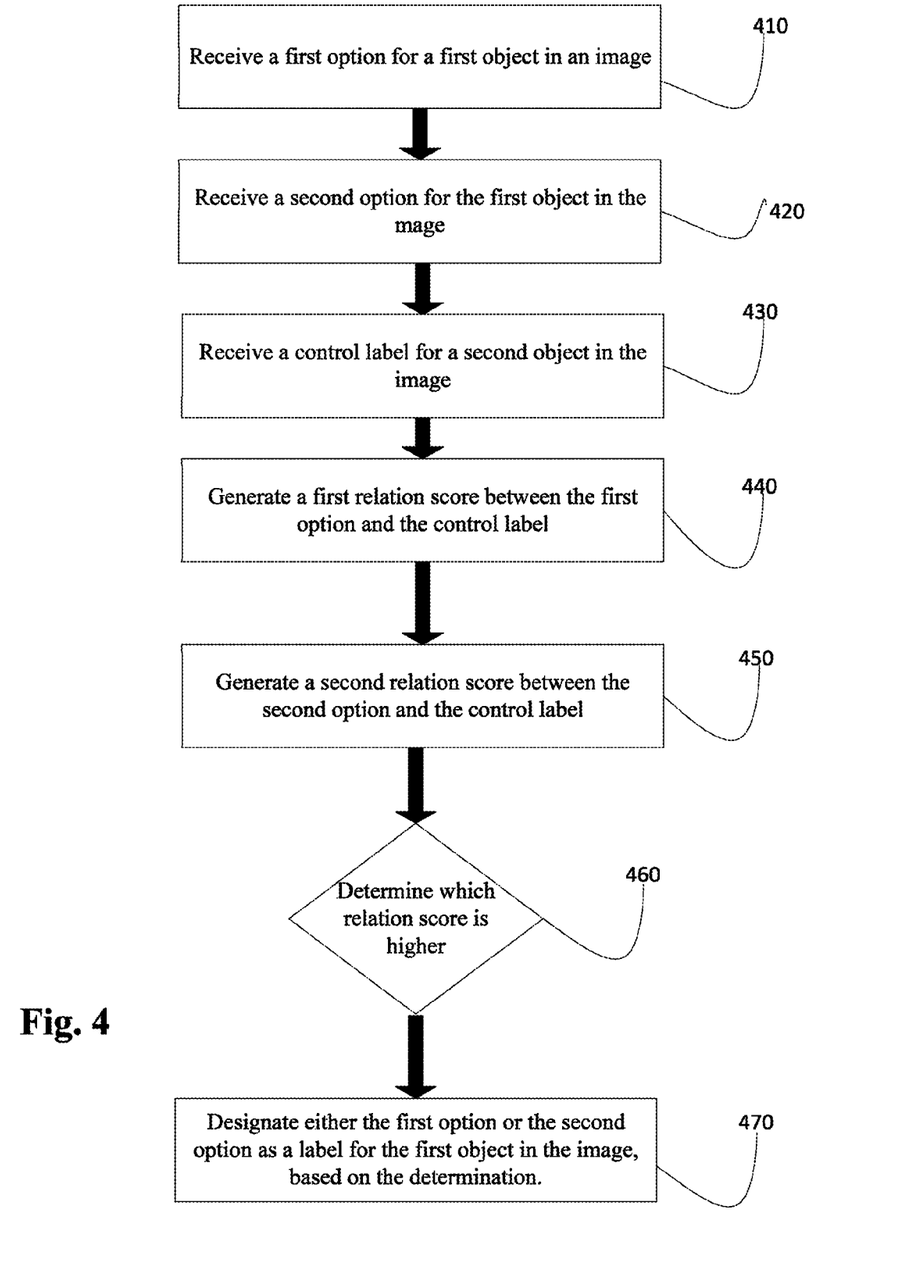
FIG. 4 shows another example process of labeling an object, according to an implementation of the disclosed subject matter.

According to an implementation of the disclosed subject matter, as shown in FIG. 4, a first option may be receive for a first object in an image at 410. A second option for the same object in the same image may also be received at 420. At 430, a control label for a second object in the same image may be received. A control label may correspond to a second object in the image and may either be an option with a high option score or may be an established label for the second object. At 440, a first relation score for the first option and the control label may be generated and, at 450, a second relation score for the second option and the control label may be generated. A determination may be made as to which relation score (i.e., for the first option and control label or for the second option and control label) is higher, at 460. The option that corresponds to the higher relation score may be applied as a label for the first object, at 470.

In an illustrative example, a first image may contain an unlabeled object as well as an object labeled as 'dinner plate'. Optical object recognition may provide two options corresponding to the unlabeled object: 'knife' and 'pen'. A relation score can be generated for the terms 'knife' and 'dinner plate'. Additionally, a relation score can be generated for the terms 'pen' and 'dinner plate'. The relation score for 'knife' and 'dinner plate' may be 96, and the relation score for 'pen' and 'dinner plate' may be 14. Accordingly, the unlabeled object may be labeled as a knife based on the higher relation score between the word 'knife' and the label 'dinner plate'. Here, the label for the unlabeled object is selected based on the co-occurrence of the words associated with the options for the unlabeled object and a labeled second object within the image.

According to an implementation of the disclosed subject matter, an image patch labeler may generate a plurality of options corresponding to a plurality of objects in an image. A single object may have a plurality of options associated with the object and the plurality of options may be selected based on high option scores. An optimization solution path may be developed to select a small subset of the options that have a high option score based on the image patch labeler and also have a high relation score based on a co-occurrence model. The solution path may be an integer programming path and may be Non-deterministic Polynomial-time hard. However, the analysis may be relaxed to a convex optimization problem with box constraints. Based on the relaxation, an efficient algorithm may be derived and may alternate between gradient descent and projection to a feasible set, which can be shown to converge to the optimum of the relaxed optimization problem. The optimization may be performed on each image, and may take, for example, only a few milliseconds to perform for images with thousands of labels.

As an example, an image X may contain multiple patches $\{x_i\}_{i=1}^{M}$, which may be of varying size and position. A patch may be detected by training a model based on a "window" (e.g., a small portion of an image). The model may provide a distribution probability over the presence of possible objects. The model may then be applied to all possible such windows in the image, at various size and positions. Windows with high scores may be identified and a corresponding position of an object may be utilized. An option scoring function $f(x_i, y_j)$ may attribute a score to a given label $y_j$ for an image patch $x_i$. The score may be generated based on any applicable option generation and/or scoring technique as disclosed herein. A relation function $s(y_j, y_k)$ as previously described may attribute a score to the expected co-occurrence/consistency of two options $y_j$ and $y_k$ based on co-occurrence of text corresponding to the options $y_j$ and $y_k$ within a text corpus. A relation score for more consistent options may be higher than a score for less consistent options. For example, continuing the earlier example, the options 'dolphin' and 'ocean' may have a higher relation score than the options 'dolphin' and 'Obama', such that s(dolphin, ocean)>s(dolphin, obama).

As another example, a graph may be constructed for each image X where each node $n_i$ corresponds to a single pair (x,y) of a patch x and option y. Here $x(n_i)$ is the patch of node $n_i$ and $y(n_i)$ is an option of node $n_i$.

A function $F(n_i)=f(x(n_i), y(n_i))$ may be defined as the option score of the option for node $n_i$ and $S(n_i, n_j)=s(y(n_i), y(n_j))$ may be defined as the consistency between nodes $n_i$ and $n_j$. For tractability purposes, the graph can contain M×K nodes, where M is the number of patches in image X and for each patch only the top K labels returned by an image patch labeler are kept. Accordingly, a global sore may be calculated by:

$$G(X, \alpha) = \sum_i \alpha_i F(n_i) + \sum_{i,j} \alpha_i \alpha_j S(n_i, n_j)$$

Where the constraints are as follows:

$$\forall i: \alpha_i = \begin{cases} 1 & \text{if the node } n_i \text{ is in the set} \\ 0 & \text{otherwise} \end{cases}.$$

$$\forall x \in X: \left(\sum_{i: x(n_i)=x} \alpha_i\right) = 1$$

And $$\left(\sum_i \alpha_i\right) \leq N$$

Figure 6A:
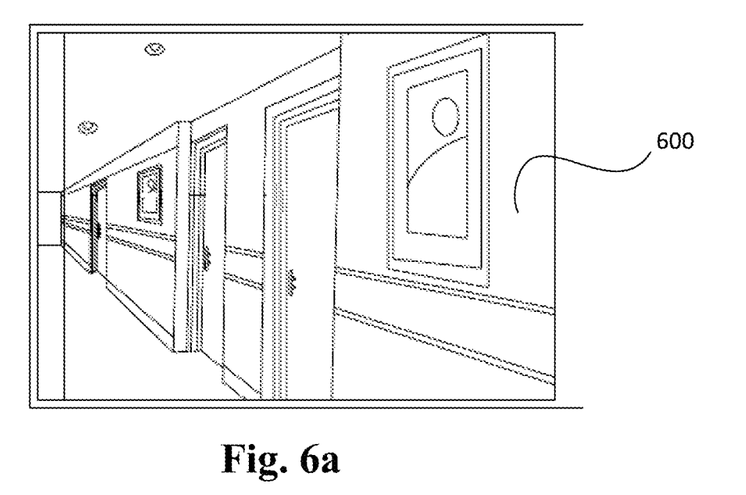
FIG. 6a shows an example illustration of an image, according to an implementation of the disclosed subject matter.
Figure 6B:
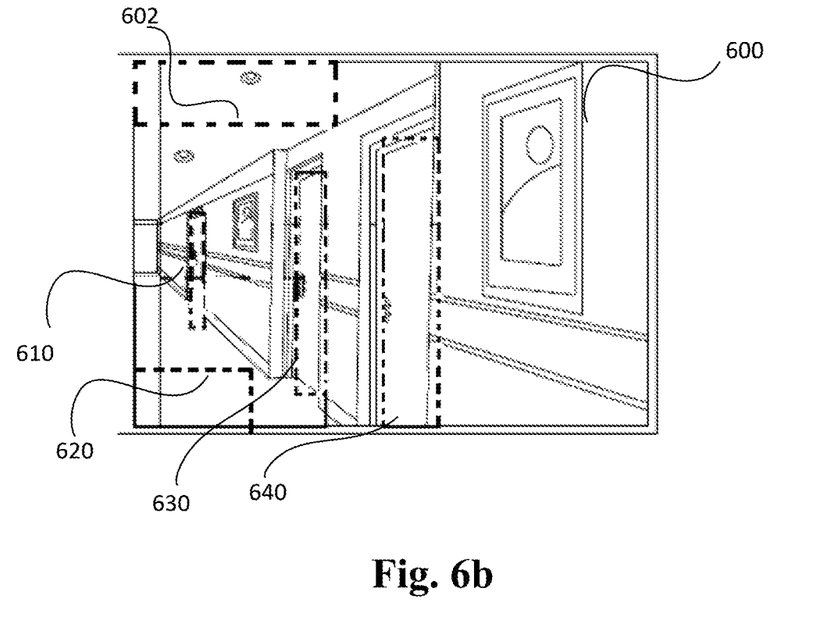
FIG. 6b shows an example illustration options for objects in an image, according to an implementation of the disclosed subject matter.

N corresponds to a hyper-parameter used to determine the size of the subset of nodes with a consistency above a threshold such that $$\operatorname*{argmax}_{\alpha} G(X, \alpha)$$

where α defines a subset of N patches and their labels that is the most consistent. The global score maybe result in labeling node $n_i$ based both on the option score $F(n_i)$ as well as the relation score $S(n_i, n_j)$. The option $y(n_i)$ may be designated as the label for node $n_i$ if the global score exceeds a global score threshold. Essentially, the global score may be directly proportional the option score and the relation score such that either a high option score or a high relation score may result in a high global score. Accordingly, either a high option score or high relation score may result in designating an option as the label for a node. As disclosed in more detail herein, a tradeoff weight between the two terms may also be applied when calculating G (X, α). The tradeoff term may enable weighing either the options score $F(n_i)$ and the relation score $S(n_i, n_j)$ different from each other, In an illustrative example of the disclosed subject matter, as shown in FIG. 6a, an unlabeled image 600 may be provided. As shown in FIG. 6b, the image 600 may be divided into multiple patches 602, 610, 620, 630, and 640. A first option, 'Ocean', associated with patch 602 may be received and may correspond to an option score of 0.4. Additionally, a second option, 'Door', associated with patch 630 may be received. A relation score may be generated for the first and options, 'Ocean' and 'Door', as previously described. As a specific example, the relation score may be 0.1, and may be based on the number of occurrences of the word 'Ocean' and the word 'Door' within text documents available on the internet or other text corpus. The global score for the patch 602 and the option, 'Ocean', may be based on the option score 0.4 and relation score 0.1 and may be 0.5 based on adding the option score 0.4 and relation score 0.1. Similarly, a third option, 'Ceiling', associated with patch 602 may be received and may correspond to an option score of 0.35. Additionally, the second option, 'Door', associated with patch 630 may be received. A relation score may be generated for the third option, 'Ceiling', and the second option, 'Door', according to techniques disclosed herein. The relation score may be 0.45. The relation score may be based on the number of occurrences of the word 'Ceiling' and the word 'Door' within text documents available on the internet or other text corpus, as previously described. The global score for the patch 602 and the option, 'Ocean', may be based on the option score 0.35 and relation score 0.45, and may be 0.8 based on adding the option score 0.35 and relation score 0.45. A global score threshold may be predetermined and may be 0.7 such that the option, 'Ocean', is disqualified as a label for the patch 602 and the option, 'Ceiling', is designated as the label for the patch 602. Alternatively, the global scores for both options, 'Ocean', and 'Ceiling', (0.5 and 0.8, respectively) may be compared and an option selected as the label based on the comparison. In this example, 'Ceiling' may be selected as a suitable label based on 0.8 being larger than 0.5.

According to an implementation of the disclosed subject matter, a regularization component may be applied in addition to an option score and/or a relation score to designate an option as a label for an object. The regularization term may prevent overfitting and may be applied using any applicable technique such as ridge regression, lasso, $L^2$ normalization, or the like. As an example, a vector of object scores may be denoted by:

$$\mu \in \mathbb{R}^p$$

The value of the external field, $\mu_j$, increases with the likelihood that object j appears in an image. A matrix of co-occurrence statistics or object pairwise relation may be denoted by $$S \in \mathbb{R}_+^{p \times p}$$

As disclosed herein, the entries for this matrix may be non-negative. Additionally, domain constraints on the set of admissible solutions may be added to extract semantics from the scores inferred for each label and as an additional mechanism to guard against overfitting. Accordingly, the following vector may be generated:

$$\alpha \in \mathbb{R}^p$$

The vector $\alpha$ may be generated by minimizing $$\lambda(\alpha|\mu,S) = \epsilon(\alpha|\mu) + \lambda C(\alpha|S) + \epsilon R(\alpha) \, s.t. \, \alpha \in \Omega,$$

where $\lambda$ and $\epsilon$ are hyper-parameters to be selected on a separated validation set. Conceptually, the first term $\epsilon(\alpha|\mu)$ measures the conformity of the inferred vector $\alpha$ to the external field $\mu$ such that this term corresponds to the option score for a potential option. The second term $\lambda C(\alpha|S)$ indicates the relation between two or more options such that a higher relation corresponds to a higher likelihood that the two or more options are present in an image. The third term corresponds to a regularization component, such as 2-norm regularization such as $R(\alpha) = \alpha^T \alpha$. The additional requirement that $\alpha \in \Omega$ may be applied to find a small subset of the most relevant options such that:

$$\Omega = \left\{ \alpha \text{ s.t. } \sum_j \alpha_j \leq N, \|\alpha\|_\infty \leq 1, \forall j : \alpha_j \geq 0 \right\}$$

Accordingly, one or more regularization factors may be applied in addition to an option score and relation score in order to generate a label for an object within an image.

Figure 1:
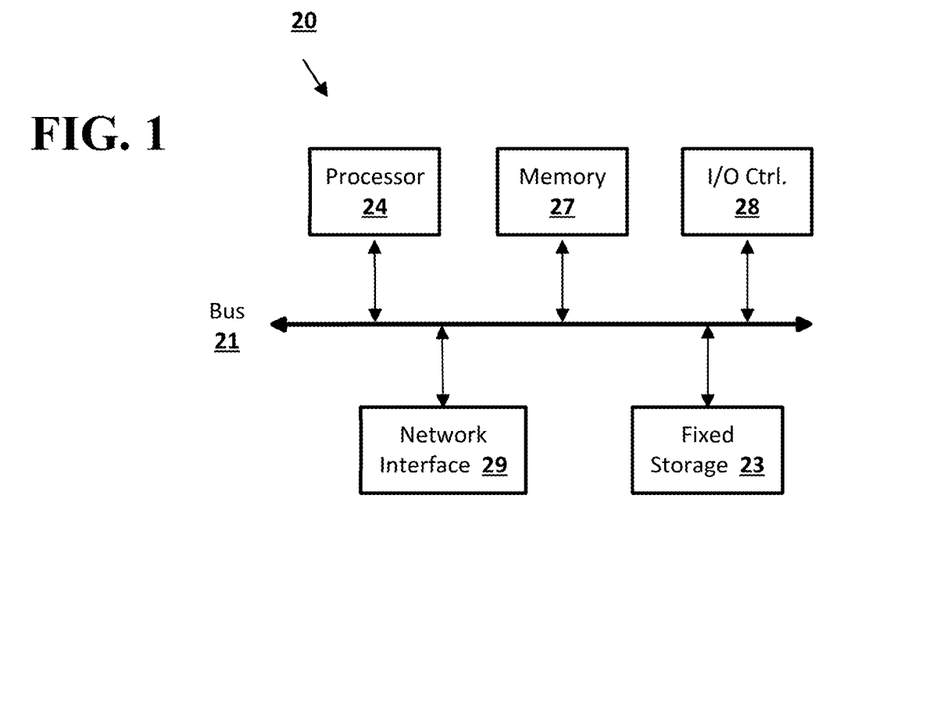
FIG. 1 shows a computer according to an implementation of the disclosed subject matter.

Implementations of the presently disclosed subject matter may be implemented in and used with a variety of component and network architectures. FIG. 1 is an example computer system 20 suitable for implementing embodiments of the presently disclosed subject matter. The computer 20 includes a bus 21 which interconnects major components of the computer 20, such as one or more processors 24, memory 27 such as RAM, ROM, flash RAM, or the like, an input/output controller 28, and fixed storage 23 such as a hard drive, flash storage, SAN device, or the like. It will be understood that other components may or may not be included, such as a user display such as a display screen via a display adapter, user input interfaces such as controllers and associated user input devices such as a keyboard, mouse, touchscreen, or the like, and other components known in the art to use in or in conjunction with general-purpose computing systems.

The bus 21 allows data communication between the central processor 24 and the memory 27. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as the fixed storage 23 and/or the memory 27, an optical drive, external storage mechanism, or the like.

Each component shown may be integral with the computer 20 or may be separate and accessed through other interfaces. Other interfaces, such as a network interface 29, may provide a connection to remote systems and devices via a telephone link, wired or wireless local- or wide-area network connection, proprietary network connections, or the like. For example, the network interface 29 may allow the computer to communicate with other computers via one or more local, wide-area, or other networks, as shown in FIG. 2.

Many other devices or components (not shown) may be connected in a similar manner, such as document scanners, digital cameras, auxiliary, supplemental, or backup systems, or the like. Conversely, all of the components shown in FIG. 1 need not be present to practice the present disclosure. The components can be interconnected in different ways from that shown. The operation of a computer such as that shown in FIG. 1 is readily known in the art and is not discussed in detail in this application. Code to implement the present disclosure can be stored in computer-readable storage media such as one or more of the memory 27, fixed storage 23, remote storage locations, or any other storage mechanism known in the art.

Figure 2:
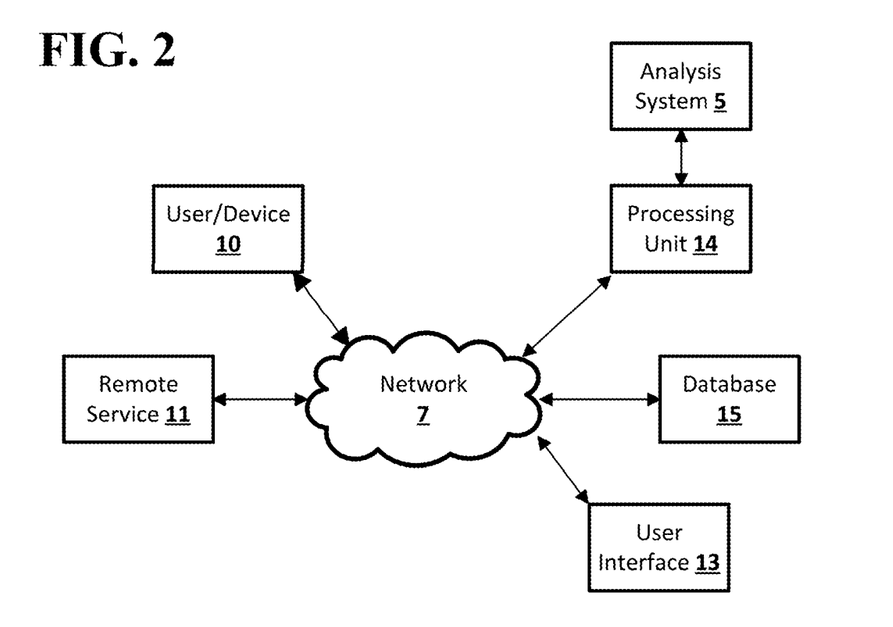
FIG. 2 shows a network configuration according to an implementation of the disclosed subject matter.

FIG. 2 shows an example arrangement according to an embodiment of the disclosed subject matter. One or more clients 10, 11, such as local computers, smart phones, tablet computing devices, remote services, and the like may connect to other devices via one or more networks 7. The network may be a local network, wide-area network, the Internet, or any other suitable communication network or networks, and may be implemented on any suitable platform including wired and/or wireless networks. The clients 10, 11 may communicate with one or more computer systems, such as processing units 14, databases 15, and user interface systems 13. In some cases, clients 10, 11 may communicate with a user interface system 13, which may provide access to one or more other systems such as a database 15, a processing unit 14, or the like. For example, the user interface 13 may be a user-accessible web page that provides data from one or more other computer systems. The user interface 13 may provide different interfaces to different clients, such as where a human-readable web page is provided to web browser clients 10, and a computer-readable API or other interface is provided to remote service clients 11. The user interface 13, database 15, and processing units 14 may be part of an integral system, or may include multiple computer systems communicating via a private network, the Internet, or any other suitable network. Processing units 14 may be, for example, part of a distributed system such as a cloud-based computing system, search engine, content delivery system, or the like, which may also include or communicate with a database 15 and/or user interface 13. In some arrangements, an analysis system 5 may provide back-end processing, such as where stored or acquired data is pre-processed by the analysis system 5 before delivery to the processing unit 14, database 15, and/or user interface 13. For example, a machine learning system 5 may provide various prediction models, data analysis, or the like to one or more other systems 13, 14, 15.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A computer implemented method comprising:
   obtaining, by one or more computers and for a first object in an image, a first set of text labels using visual data extracted from the image;
   obtaining, by the one or more computers and for a second object in the image, a second set of text labels using the visual data extracted from the image;
   generating, by the one or more computers and for various pairs of text labels, a relation score based on a number of co-occurrences of the text labels in text of web pages, wherein each pair of text labels includes a text label from the first set and a text label from the second set; and
   labeling, by the one or more computers, the image with a given pair of text labels, from among the various pairs of text labels, based on solving a global optimization problem utilizing at least the relation score, wherein the relation score for the given pair of text labels meets a specified threshold relation score.

2. The method of claim 1, wherein generating the relation score comprises generating the relation score using a co-occurrence machine learning model trained using a text corpus.

3. The method of claim 1, further comprising designating a label for the first object based on a regularization factor.

4. The method of claim 1, further comprising determining a frequency at which pairs of text labels co-occur within a text corpus.

5. The method of claim 1, wherein generating the relation score comprises generating the relation score based on co-occurrences that are within a limit selected from the group consisting of: adjacent words or terms, a number of words, an area, a same sentence, a same paragraph, a same page, and a same document.

6. The method of claim 1, wherein the first set of text labels is generated using an image patch labeler.

7. The method of claim 6, further comprising:
   applying a machine learned model to visual data extracted from the first object in the image; and
   generating the first set of text labels based on the applied model.

8. The method of claim 1, wherein the first object is an area of an image.

9. The method of claim 8, wherein the second object is an area of an image different than the area of the image corresponding to the first object.

10. The method of claim 1, wherein receiving a first option for a first object further comprising:
    determining a first potential text label with a first option score, for the first object;
    determining a second potential text label with a second option score, for the first object;
    determining that the first option score is higher than the second option score; and
    providing the first potential text label in the first set of text labels based on determining that the first option score is higher than the second option.

11. The method of claim 10, wherein the first option score and the second option score are assigned based on a likelihood that that the first potential label and the second potential label identify the first object.

12. The method of claim 1, further comprising:
    receiving a search query;
    identifying the image based on the label for the first object as a result for the query; and
    providing the image based on the identification.

13. The method of claim 1, wherein generating the relation score is done, in part by a analyzing a sample of documents from a standardized corpus.

14. A system comprising:
    a data storage device storing machine readable instructions; and
    a processor that interacts with the data storage device and executes the machine readable instructions, wherein execution of the machine readable instructions cause the processor to perform operations comprising:
       obtaining, by one or more computers and for a first object in an image, a first set of text labels using visual data extracted from the image;

obtaining, by the one or more computers and for a second object in the image, a second set of text labels using the visual data extracted from the image;

generating, for various pairs of text labels, a relation score based on a number of co-occurrences of the text labels in text of web pages, wherein each pair of text labels includes a text label from the first set and a text label from the second set; and labeling, by the one or more computers, the image with a given pair of text labels, from among the various pairs of text labels, based on solving a global optimization problem utilizing at least the relation score, wherein the relation score for the given pair of text labels meets a specified threshold relation score.

15. The system of claim 14, wherein generating the relation score comprises generating the relation score using a co-occurrence machine learning model trained using a text corpus.

16. The system of claim 14, wherein the instructions cause the processor to perform actions further comprising designating a label for the first object based on a regularization factor.

17. The system of claim 14, further comprising determining a frequency at which pairs of text labels co-occur within a text corpus.

18. The system of claim 14, wherein generating the relation score comprises generating the relation score based on co-occurrences that are within a limit selected from the group consisting of: adjacent words or terms, a number of words, an area, a same sentence, a same paragraph, a same page, and a same document.

19. A device comprising:
a storage; and
a processor configured to:
obtain, for a first object in an image, a first set of text labels using visual data extracted from the image;

obtain, for a second object in the image, a second set of text labels using the visual data extracted from the image;

generate, for various pairs of text labels, a relation score based on a number of co-occurrences of the text labels in text of web pages, wherein each pair of text labels includes a text label from the first set and a text label from the second set; and label the image with a given pair of text labels, from among the various pairs of text labels, based on solving a global optimization problem utilizing at least the relation score, wherein the relation score for the given pair of text labels meets a specified threshold relation score.

20. The device of claim 19, wherein the relation score is generated using a co-occurrence machine learning model trained using a text corpus.

21. The device of claim 19, further configured to designate a label for the first object based on a regularization factor.

22. The device of claim 19, wherein the device is configured to determine a frequency at which pairs of text labels co-occur within a text corpus.

23. The device of claim 19, wherein the relation score is generated based on co-occurrences that are within a limit selected from the group consisting of: adjacent words or terms, a number of words, an area, a same sentence, a same paragraph, a same page, and a same document.

* * * * *